United States Patent

Seipp

[15] 3,671,817

[45] June 20, 1972

[54] HIGH ACCURACY SOLID STATE TIMER

[72] Inventor: William H. Seipp, Bettendorf, Iowa

[73] Assignee: Gulf & Western Industries, Inc., New York, N.Y.

[22] Filed: Dec. 28, 1970

[21] Appl. No.: 101,598

Related U.S. Application Data

[63] Continuation-in-part of Ser. No. 33,851, May 1, 1970, abandoned.

[52] U.S. Cl. ..........................................317/141 S, 307/141

[51] Int. Cl. ..........................................H01h 47/18

[58] Field of Search ..................317/141, 142; 307/293, 141, 307/142

[56] References Cited

UNITED STATES PATENTS 3,192,449 6/1965 Brockett..............................317/141 S

*Primary Examiner*—William H. Beha, Jr.

*Assistant Examiner*—Harry E. Moose, Jr.

*Attorney*—Meyer, Tilberry and Body

[57] ABSTRACT

A timer circuit consists of a resistance-capacitor charging network with an adjustable potentiometer providing a predeterminable comparison voltage according to the length of time desired and operational amplifier connected as a comparator between the capacitor and the potentiometer providing current gain and high input impedance to prevent loading the capacitor. The non-inverting input of the operational amplifier is coupled to the capacitor and the output of the operational amplifier is fed back to the inverting input of the operational amplifier. A field-effect transistor is provided for discharging the capacitor to zero at the end of the timing cycle in order to avoid the effect of discharge potential difference of other types of discharge devices. A supplemental circuit is provided for illuminating a pilot light precisely during the time that the charging cycle is going on.

20 Claims, 5 Drawing Figures

INVENTOR.
WILLIAM H. SEIPP
BY Meyer, Tilberry & Body
ATTORNEYS

INVENTOR.
WILLIAM H. SEIPP
BY Meyer, Tilberry & Body
ATTORNEYS

INVENTOR.
WILLIAM H. SEIPP

BY

Meyer, Tilberry & Body
ATTORNEYS

INVENTOR.
WILLIAM H. SEIPP
BY
Meyer, Tilberry & Body
ATTORNEYS

HIGH ACCURACY SOLID STATE TIMER

This application is a continuation-in-part of application Ser. No. 33,851 filed May 1, 1970 now abandoned.

BRIEF DESCRIPTION OF THE INVENTION

It is an object of the invention to provide a highly accurate solid state timer with a high degree of circuit reliability and compensated for temperature variations under load.

In carrying out the invention in accordance with the preferred form thereof, an alternating-current power supply is employed. A full wave rectifier is connected to the alternating-current power supply with a resistance capacity filter circuit for initial smoothing of the direct-current voltage and a Zener diode serves for setting voltage of direct-current power supply. The resistance-capacity network is supplied with current by the direct-current power supply. However, for further voltage regulation and temperature compensation under load, the resistance capacity timing network is connected in parallel with three series-connected Zener diodes of the type which maintain their voltage independently of temperature variations with load, the Zener diodes in turn being connected in series with the resistor.

A potentiometer is also connected across the temperature compensated voltage source with an adjustable tap thereon for selecting the desired length of the time period.

An operational amplifier is interposed between the capacitor and the adjustable tap of the potentiometer. The output of the operational amplifier is coupled to the potentiometer tap through the input of a second operational amplifier serving as a voltage comparator and the output of the first operational amplifier is also fed back to the inverting input of the first operational amplifier. However, the charging circuit capacitor is coupled to the non-inverting input of the operational amplifier. To increase input impedance and, as nearly as possible draw zero current, coupling to both of the inputs of the operational amplifier is through transistors. Any variation in properties with temperature of one input transistor is compensated by corresponding variations in the other.

An output relay is provided with an actuating coil which is connected to the output of the second operational amplifier. A field-effect transistor is connected across the charging circuit capacitor for resetting. The output of the second operational amplifier is coupled to the control electrode of transistor amplifiers to actuate an output relay at the end of the timing period. The field-effect transistor is normally biased "on," and control circuitry is provided including either an input relay or an input transistor for biasing the field-effect transistor "off" at the initiation of a timing cycle. The control circuitry also controls transistors actuating a pilot light to indicate the existence of the timing period.

A better understanding of the invention will be afforded by the following detailed description considered in conjunction with the accompanying drawings.

DRAWINGS

In the drawings FIG. 1 is a circuit diagram of an embodiment of the invention in which the pilot light is a neon tube energized by the alternating-current supply and the output relay is actuated at the conclusion of the timing period.

Like reference characters are utilized throughout the drawings to designate like parts.

DETAILED DESCRIPTION

Figure 1:
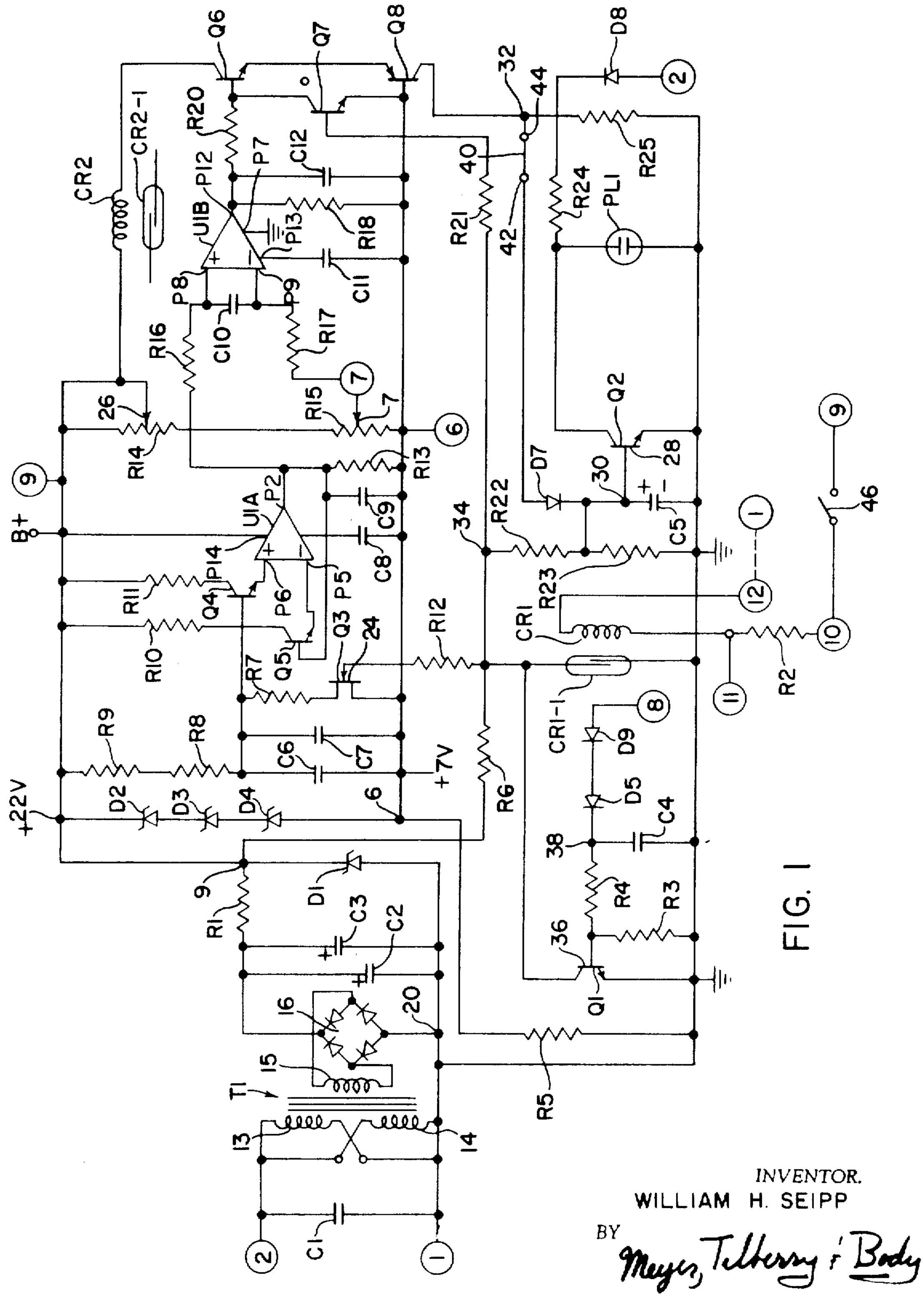

The timer constituting the invention may be energized by either alternating current or direct current. When alternating current is used, a transformer T1 is provided having primary winding coils 13 and 14 connected to terminals 1 and 2 for connection to a central-station alternating-current supply circuit. In order that either a 120 volt or 240 volt input may be employed, the primary winding consists of two coils 13 and 14 which are connected in parallel as shown, to the terminals 1 and 2 when the input is at 120 volts and may be reconnected for series connection when the input is at 240 volts. For transient suppression a capacitor C1 is connected between the terminals 1 and 2.

The transformer T1 has a secondary winding 15 connected through a full-wave diode rectifier 16 and a filter resistor R1 to terminals 9 and 20, constituting the direct-current input terminals for the timer circuit. The terminal 20 is shown as grounded. Filter capacitors C2 and C3 are connected across the output of the full wave rectifier 16 in advance of the filter resistor R1. In the embodiment illustrated, which is designed for 22 volt direct-current supply, a 22 volt Zener diode D1 is connected between the terminals 9 and 20.

In order to render the time period measured independent of variations in temperature, a voltage supply for the resistance capacity timer network is obtained by providing three Zener diodes D2, D3 and D4 connected in series with a resistor R5 between the direct-current voltage supply terminals 9 and 20. The resistance-capacitance network is designed for 15 volt input and the Zener diodes D2, D3 and D4 are 5.1 volt diodes which have a voltage which is independent of temperature variations under load. The junction terminal 6 of the diode 4 and the resistor R5 is accordingly a 7 volt terminal with respect to the ground terminal 20.

The resistance-capacitance network comprises one or more resistors R8 and R9 connected in series with one or more parallel connected capacitors C6 and C7 between the 22 volt terminal 9 and the 7 volt terminal 6. The capacitors C6 and C7 are preferably metallized polycarbonate capacitors because of their extremely low temperature coefficient and low leakage so as to provide capacitance stabilization without regard to temperature change.

For discharging the capacitors C6 and C7 to zero potential difference at the end of a timing period and for maintaining the capacitors at zero potential before the commencement of a timing period, a field effect transistor Q3 in series with a discharge resistor R7 is connected across the capacitors C6 and C7. The transistor Q3 has a gate which is forward biased to produce zero potential difference between the drain and the source of the field-effect transistor Q3 except during the timing period in a manner as will be explained in greater detail hereinafter.

For responding accurately and reliably to the potential at the positive terminal of the capacitors C6 and C7 an integrated circuit is provided having two operational amplifier components U1A and U1B shown separately in the drawing as components of a P1A-14. The integrated circuit has an anode supply pin P14 connected to the B+ or 22 volt direct-current power supply terminal 9 and a pin P7 which is grounded.

The non-inverting input pin P6 of the operational amplifier U1A is coupled to the positive terminal or plate of the capacitors C6 and C7 whereas the output pin P2 of the operational amplifier U1A is fed back for a coupling to the inverting input pin P5 of the operational amplifier U1A. Preferably, however, in order to increase the input impedance and avoid loading the capacitors C6 and C7 for maximum precision in the timing operation, NPN transistors Q4 and Q5 are interposed in the coupling to the inputs to the operational amplifier U1A. The collectors of the transistors Q5 and Q4 are connected through resistor R10 and R11, respectively, to the positive current supply terminal 9; and the transistors Q4 and Q5 are connected in Darlington to transistors within the operational amplifier U1A.

A potentiometer for providing capacitor comparison voltage is provided consisting of resistors R14 and R15 connected in series between the terminals P6 and P9. The resistor R15 has a sliding contact 7 for selecting the time period to be produced by the timer. Contact 7 is coupled indirectly to the output pin P2 of the operational amplifier U1A. The resistor R14 has a slidable tap 26 connected to the B+ terminal 9 for calibration adjustment.

The output at pin P2 of the operational amplifier U1A is connected to the non-inverting input at pin P8 of the operational amplifier U1B through a resistor R16; and the contact 7 of the potentiometer resistor R15 is connected to the inverting input at pin 9 of the operational amplifier U1B through a resistor R17.

A transistor amplifier comprising an NPN transistor Q6 and a PNP transistor Q8 in series is provided for coupling the output at the pin P12 the operational amplifier U1B to an output relay actuating coil CR2. The transistors Q6 and Q8 are connected in series with the coil CR2 between the positive B+ supply terminal 9 and the negative or grounded terminal 20. The base of the transistor Q6 is connected to the output of the operational amplifier U1B through a resistor R20. A failsafe NPN transistor Q7 is connected between the bases of the transistors Q6 and Q8 with a base which is connected in series with resistors R6 and R21 to the positive power supply terminal 9.

A pilot lamp PL1 is provided for indicating that timing is going on. It is connected between the alternating-current supply terminal 2 and the grounded alternating-current supply terminal 1 in series with a diode D8 and a resistor R24. For extinguishing the pilot lamp PL1 except during a timing cycle, an NPN transistor Q2 is connected across its terminals having a base 28. The base 28 is connected to a junction 30 of a capacitor C5 and a diode D7 between the ground terminal 1 and a terminal 32, which is a junction terminal between the collector of the transistor Q8 and the resistor R25. The junction 30 is connected to the junction of voltage divider resistors R22 and R23 between terminals 34 and 6.

For control of the timing circuit and the pilot lamp a relay is provided having contacts CR1-1 actuated by a coil CR1 adapted to be connected to a voltage source at terminals 10 and 12 in series with a resistor R2. The relay contacts CR1-1 are connected between the ground terminal 1 and a junction terminal 34 of resistors R6 and R21, which are connected between the positive direct-current supply terminal 9 and the base of the failsafe transistor Q7 for inactivating the transistor Q7 and illuminating the pilot lamp PL1 when it is desired to initiate a timing period. A transistorized control is also provided which may be employed in place of the input relay CR1. This comprises an NPN transistor Q1 connected in parallel with the contacts CR1-1 having a base 36 connected to a terminal 8, at which timer starting voltage may be applied in series with a resistor R4 and diodes D5 and D9. A resistor R3 is also connected between the base 36 and the ground terminal 1.

Means are also provided for rendering the timer free from transient effects. This includes a capacitor C1 connected between the alternating current input terminals 1 and 2, a capacitor C8 connected between the pin P1 of the operational amplifier U1A and capacitor C9 connected between the base of the transistor Q5 and the terminal 6, a bleed resistor R13 connected across the capacitor C9, a capacitor C10 connected between the inverting and non-inverting input pins P8 and P9 of the operational amplifier U1B, capacitor C11 connected between the pin P13 of the operational amplifier U1B and the terminal 6, capacitor C12 connected between the output of the operational amplifier U1B and the terminal 6, bleed-off resistor R18 connected across the capacitor C12, a capacitor C4 connected between the ground terminal 1 and the junction 38 of the resistor R4 and the diode D5.

OPERATION

The capacitor C6 and C7 and the resistors R8 and R9 of the resistance capacitor timing network are interchangeable with units of other values depending upon the timing range desired. For some ranges the capacitors will be used in parallel and not in others.

When the circuit is reset by turning on the field-effect transistor Q3, the capacitors C6 and C7 are fully discharged to zero volts because of the characteristics of the field-effect transistor which acts like a resistor when it is turned on in contrast to ordinary transistors which have a minimal voltage drop across them of about 0.2 of a volt which varies under temperature variations and also varies with time.

The voltage across the capacitor C6 and C7 while they are charging is fed into the operational amplifier U1A which has the input transistors Q4 and Q5 to provide high current gain and a very high input impedance for the amplifier. This prevents loading of the capacitor C6 and C7 and prevents discharging them during timing. For high accuracy the leakage current coming out of the capacitors is thus kept very small.

Each of the operational amplifiers U1A and U1B is a differential amplifier so that the output voltage on pin P2 of the operational amplifier U1A is proportional to the difference between the voltages applied to the inverting and non-inverting inputs at pins P5 and P6. Since the transistors Q4 and Q5 are in Darlington with transistors inside the integrated circuit they provide current gain for increased input impedance.

As soon as the potential on the non-inverting input pin P6 of the operational amplifier U1A becomes more positive than that on the inverting input pin P5, the output voltage of the operational amplifier goes positive and vice versa. Since the output voltage on the pin P2 of the operational amplifier U1A is fed back to the base of the transistor Q5, the operational amplifier will have as an output on pin P2 a close approximation of the voltage which is on the base of the transistor Q4 because in this configuration the amplifier acts to maintain zero volts between its input terminals.

The use of two input transistors to the operational amplifier U1A provides temperature compensation because the transistors will act the same under temperature variations and thus temperature effects are cancelled.

The output voltage on the pin P2 of operational amplifier U1A is applied to the input of the second operational amplifier, U1B acting as a voltage comparator. So long as the voltage on the inverting input pin is more positive than that on the non-inverting input pin P8, the voltage at the output pin P12 will remain at a very low value. However, as soon as the voltage on the pin P8 becomes more positive than that on the pin P9, the output voltage on pin P12 will go positive and drive the output circuit to close the output relay CR2-1. This takes place because at the start of timing the voltage across capacitors C6 and C7 is zero. The output voltage on pin P2 of operational amplifier U1A is also zero volts relative to the 7 volt terminal 6. The comparison voltage at the contact 7 of the potentiometer resistor R15 is present at the pin P9, the non-inverting input of the operational amplifier U1B. As the capacitors C6 and C7 charge the voltage on the pin P2 of the operational amplifier U1A follows the rise of voltage on the capacitors.

When the value of voltage on the capacitors and the output of the operational amplifier U1A equals that of the timing potentiometer, the output of the operational amplifier U1B will switch from its nearly ground potential terminal 1 to a value nearly equal to the B+ voltage at the terminal 9 and energize the output relay CR2. The output voltage of the operational amplifier U1B acts as a trigger for the output relay circuit. For a circuit with the voltage values given by way of example in the embodiment described, the base of the transistor Q8 is connected to the +7 volt terminal 6. If the output voltage on the pin P12 of the operational amplifier U1B is lower than the +7 volts, both transistors Q6 and Q8 will be off and the output relay will be de-energized. If however, the voltage on pin P12 of the operational amplifier U1B goes positive, the transistor Q6 is turned on, which also turns on transistor Q8 by supplying emitter voltage thereto at a potential exceeding that of that base. As both transistors Q6 and Q8 become conducting, the output relay CR2 is energized. Current passes through the winding CR2 and through the transistors Q6 and Q8 to ground through the resistor R25, part of a network which drives the pilot light indicator PL1.

The transistor Q7 acts as a switch to make sure that if the timing potentiometer is set at zero, the output relay will be de-energized when the input circuitry is not calling for a timing or a time-out condition. If there is no voltage applied to the start signal terminal 8 of the timer control circuit or no voltage applied to the relay CR1, the transistor Q7 insures that the output relay will remain in de-energized position. The transistor Q7 accomplishes this by short circuiting the base of the transistor Q6 to the base of transistor Q8 thus making it impossible for transistors Q6 and Q8 to be in conducting condition.

Upon energization of the input relay CR1, the voltage at the collector of the transistor Q1 is at ground potential. The same thing happens if transistor Q1 is turned on by applying a voltage to terminal 8. For the circuit values assumed in the illustrative embodiment a direct-current starting voltage of 10 – 18 volts may be applied to the terminals 11 and 12 for actuation of the winding CR1 or a direct-current voltage from 18 to 28 volts may be applied between the terminals 10 and 12 in series of the resistor R2.

When the input relay CR1 is de-energized and the transistor Q1 is also de-energized, a voltage will exist on the collector of the transistor Q1, which drives the field-effect reset transistor Q3, the zero-setting failsafe transistor Q7, as well as the pilot light control transistor Q2. With the field-effect transistor Q3 biased to the on condition the capacitors C6 and C7 are shorted out. With failsafe transistor Q7 biased on, the base of the transistor Q6 is shorted to the base of the transistor Q8 and the output relay CR2 is maintained in a de-energized position. Since the base 28 of the transistor Q2 is connected to the junction terminal 34, which is at positive potential when the transistor Q1 and the input relay CR1 are de-energized, the transistor Q2 is biased on for maintaining the pilot light PL1 off.

However, when either transistor Q1 or the input relay CR1 is energized, the voltage at the base of the transistor Q1 drops to zero. This turns off the field-effect transistor Q3 and allows the capacitors C6 and C7 to charge, initiating the timing. Transistor Q7 is then biased off, allowing the output relay to operate in normal fashion. Likewise the transistor Q2 is biased off so that the pilot light can turn on, indicating timing cycle is in progress. When the output relay CR2 is energized a voltage will exist on the collector of the transistor Q8 which will forward bias the diode D7 and the transistor Q2 to turn off the pilot light PL1 at the end of the timing cycle. Consequently the pilot light is maintained in the "on" condition only while timing is in progress.

The capacitor C1 suppresses transients coming in on the input power supply lines. Capacitors C8, C9, C11 and C12 and also resistors R13 and R18 provide transient suppression in the timing circuitry and the voltage comparator circuitry. These capacitors and resistors have the effect of limiting the frequency of response of the operational amplifiers.

The alternating-current gain of the operational amplifiers is minimized to minimize the effects of transient voltages. This is accomplished by shunting the input of the operational amplifier U1B by a large-capacity capacitor C10. The operational amplifier U1B has a high voltage gain so that this is necessary. However, it is not necessary in the case of the operational amplifier U1A which operates at a voltage gain of unity. It is sufficient to limit the transient response of the operational amplifier U1A by means of the capacitors C9 and C8 and the resistor R13. The transient suppressing effect of the capacitor C9 prevents transients from turning on and off the pilot light PL1 even though the output relay is not fluctuating. The differential amplifiers in the integrated circuit U1A, U1B accomplish temperature stabilization and compensation because the differential amplifiers have a balanced input and are stable over a wide temperature range.

Figure 3:
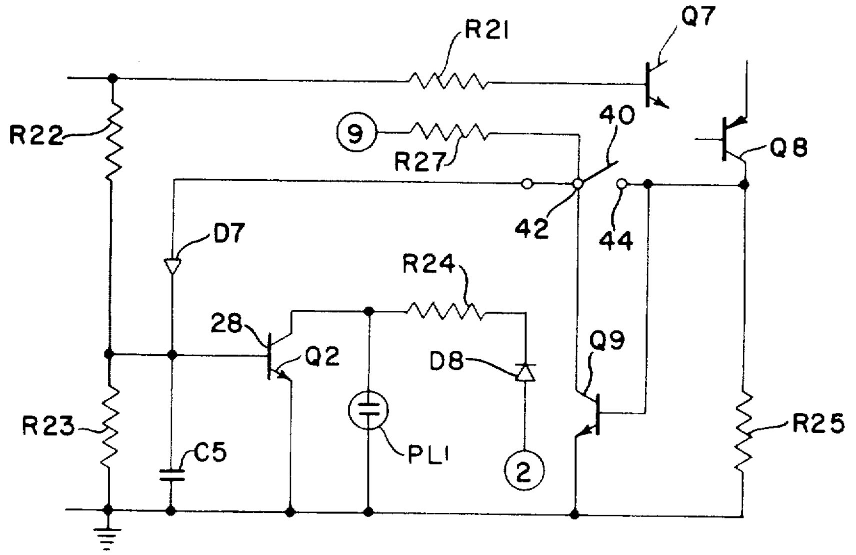
FIG. 3 is a fragmentary circuit diagram of a modification in the embodiment of FIG. 1 in which the output relay is normally energized but de-energized at the conclusion of the timing period.

The timer has considerable versatility. For example, the pilot light may be operated as shown to be turned on when the timing period is going on. However, if desired, it may be arranged to go off during the timing period and be turned on the remainder of the time. This is accomplished merely by providing a jumper 40 between terminals 42 and 44 of FIG. 1, removing the jumper 40 and interposing an inverting stage consisting of an NPN transistor Q9 as illustrated in FIG. 3 with a collector connected to the terminal 42 and a base connected to the terminal 44, with the collector supplied with voltage from the B+ terminal 9 through a resistor R27.

Figure 2:
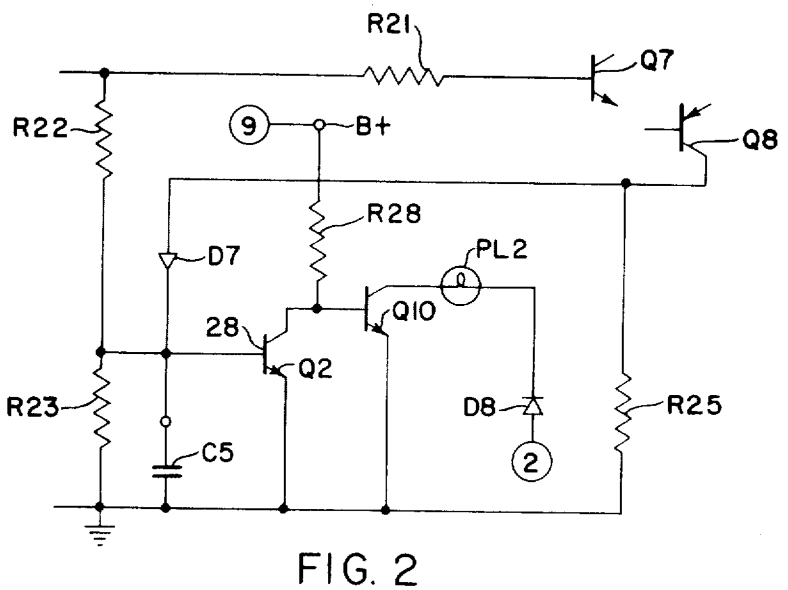
FIG. 2 is a fragmentary diagram of a modification of the circuit of FIG. 1 for use when an incandescent lamp is employed.

Also if it is desired to utilize an incandescent lamp PL2 instead of the neon tube PL1 as the indicator of timing being in process this may be accomplished by substituting an incandescent lamp PL2 for the resistor R24 of FIG. 1 and interposing an inverting stage consisting of an NPN transistor Q10 as illustrated in FIG. 2. The inverting stage is required because in the case of an incandescent lamp current must be passed through it to turn it on instead of removing a short as in FIG. 1. The inverting stage Q10 is forward biased by means of a resistor R28 connected between the base of the transistor Q10 and the B+ supply terminal 9 with the collector of the pilot light control transistor Q2 connected to the base of the inverting transistor Q10. An incandescent pilot lamp is utilized in 24 volt alternating-current or direct-current operation because there is not sufficient voltage to drive a neon lamp.

Several alternative means of accomplishing timing are provided. Line terminal 2 may be connected to the time start terminal 8 and an inductive load may be switched in parallel with the terminal 8 to provide simplified circuitry for a large control system. Alternatively an isolated direct-current supply may be employed for triggering the input at terminal 10 or 11 depending upon the voltage of the isolated direct-current supply.

The increased accuracy of the direct current reset may also be obtained by utilizing the internal power supply of the circuitry. This is done by connecting terminal 12 to terminal 1 and connecting terminal 9 to terminal 10 through an appropriate switch 46. Thus 22 volts is applied across the direct-current input terminals 10 and 12.

Figure 4:
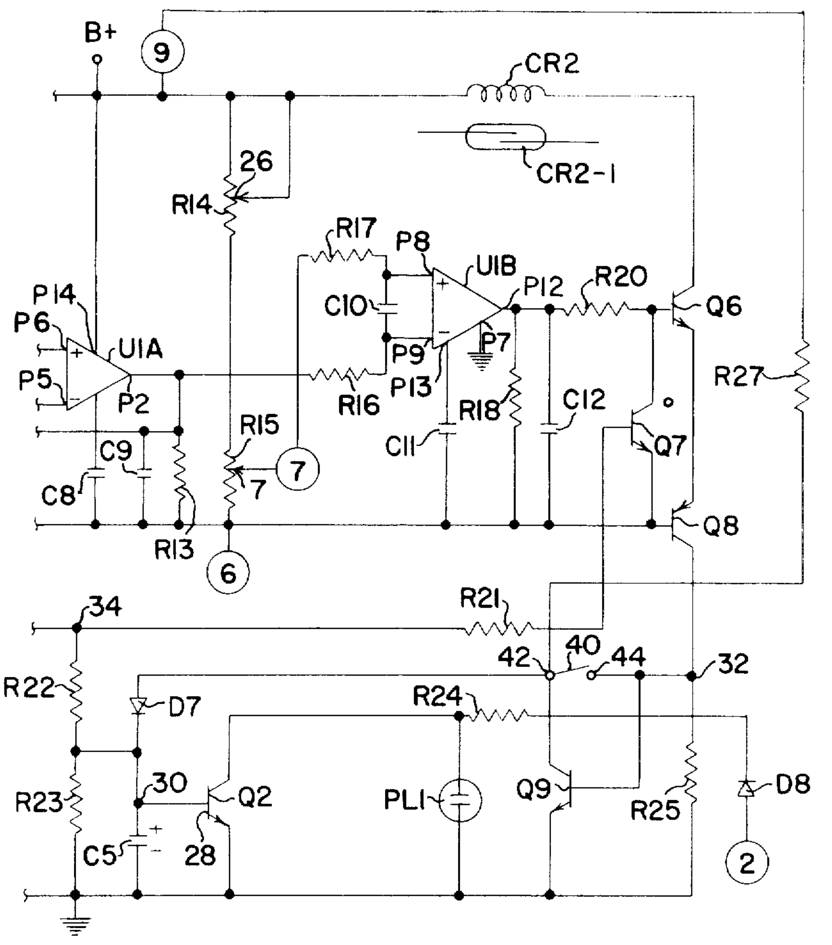
FIG. 4 is a fragmentary diagram of the circuit employed when open-closed-open operation is desired.

In the arrangement illustrated in FIG. 1 open-open-closed operation occurs and the output relay is energized at the end of the time period. However, open-closed-open operation may also be provided merely be interchanging connectors between the pins 8 and 9 of the operational amplifier U1B as illustrated in FIG. 4. This also requires the change in the pilot light driver circuitry illustrated in FIG. 3.

The timing arrangement illustrated in FIG. 1 is referred to as OOX timing in which the switch CR2 is open before timing starts, and closes when the circuit times out. Other timing arrangements may also be provided such as OXO and XXO timing.

In OXO timing the switch CR2 remains open until timing starts, closes when timing starts and reopens when the circuit times out. In OXO operation, referring to FIG. 4, when the potential across the capacitors C6 and C7 reaches the reference potential, the output of the operational amplifier U1B falls to zero, the transistors Q6 and Q8 are turned off because their bases are no longer fully biased, current is cut off in the winding CR2 and the switch CR2–1 opens. This occurs because in FIG. 4 the input connections of the operational amplifier U1B are reversed as compared with FIG. 1, so that initially the non-inverting input terminal 8 is at reference potential and the inverting input terminal 9 is at the potential of the terminal 6, so that the operational amplifier U1B produces its maximum output and the transistors Q6 and Q8 are forward biased as soon as the start switch CR1–1 is closed to reverse bias the base of the transistor Q7 to turn the transistor Q7 off.

Figure 5:
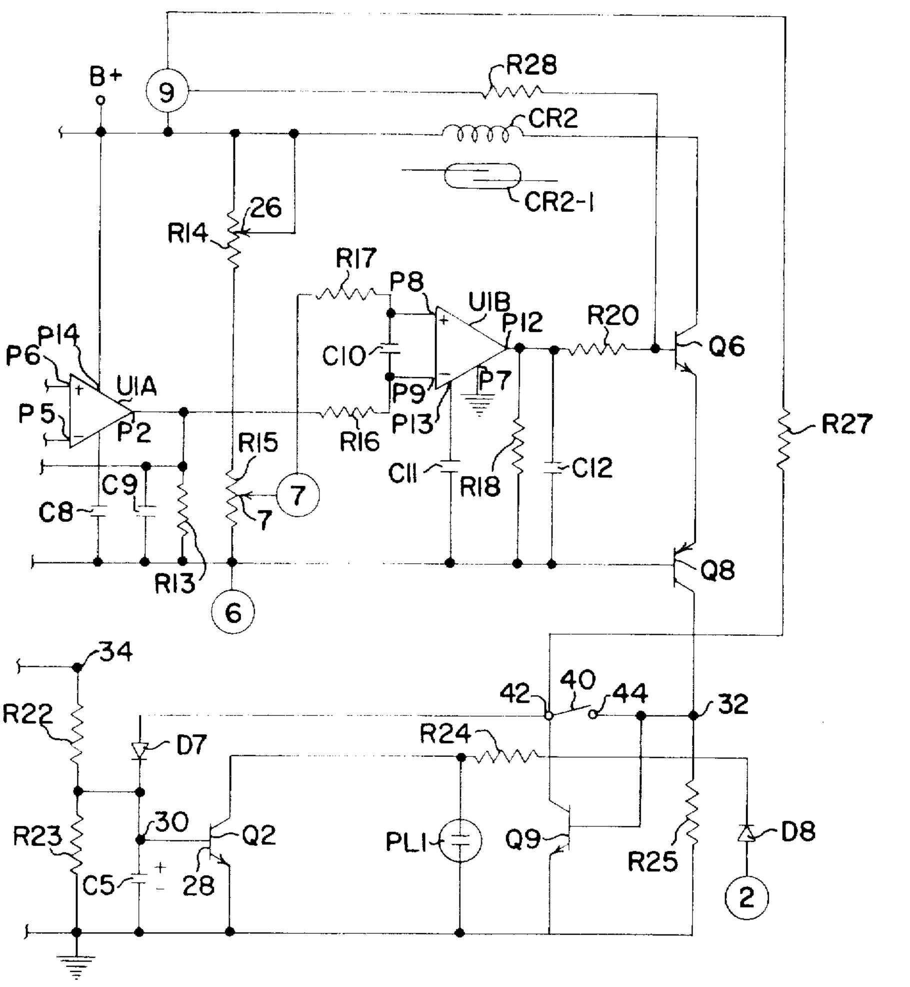
FIG. 5 is a fragmentary circuit diagram of the arrangement employed when closed-closed-open switch operation is desired.

XXO operation takes place in a manner similar to OXO operation. However, because as illustrated in FIG. 5, the transistor Q7 is omitted there is nothing to prevent forward biasing of the transistors Q6 and Q8 before timing commences so that even before the switch CR1 is closed or the transistor Q1 is turned on, current flows through the transistors Q6 and Q8 and the winding CR2. Then when the voltage across the capacitors C6 and C7 reaches the reference voltage potential between the terminal 7 and the terminal 6, the circuit times out and the transistors Q6 and Q8 are turned off as described in connection with the operation of FIG. 4. If desired, in the arrangement of FIG. 5, a forward biasing resistor R28 may be provided.

The potentiometer slider contact 7 is attached to a pointer (not shown) cooperating with a dial which is expanded at the lower end in accordance with the exponential charging properties of the capacitors thus providing expanded accuracy at the lower time end of the timer.

The invention is not limited to particular electrical constants however satisfactory results have been obtained where electrical components have been employed with constants indicating the following table.

| | |
|---|---|
| C1 | .01 mf |
| C2 | 125 mf |
| C3 | 125 mf |
| C4 | .033 mf |
| C5 | .1 mf |
| C6 & | |
| C7 | Varied according to the time range desired. |
| C8 | 220 mf |
| C9 | .1 mf |
| C10 | 1 mf |
| C11 | 220 mf |
| C12 | .1 mf |
| Resistances | |
| R1 | 51 Ohms, 1 Watt |
| R2 | 1000 Ohms |
| R3 | 47 Kilohms |
| R4 | 150 Kilohms |
| R5 | |
| R7 | 33 Ohms |
| R8 & | |
| R9 | Varied according to the time desired. |
| R10 | 240 Kilohms |
| R11 | 240 Kilohms |
| R12 | |
| R13 | 10 Kilohms |
| R14 | 20 Kilohms |
| R15 | 10 Kilohms |
| R16 | 10 Kilohms |
| R17 | |
| R18 | 10 Kilohms |
| R19 | |
| R20 | 10 Kilohms |
| R21 | 10 Kilohms |
| R24 | 27 Kilohms |
| R25 | 1 Kilohm |
| R22 | 10 Kilohms |
| R23 | 1 Kilohm |
| R26 | 1 Kilohm |
| R27 | 27 Kilohms |
| R28 | 200 Kilohms |
| Transistors | |
| Q1 | 2N3565 |
| Q3 | 2N4392 field-effect transistor |
| Q5 | 2N3565 |
| Q4 | 2N3565 |
| Q6 | 2N3569 |
| Q7 | 2N3569 |
| Q8 | 2N3638 |
| Q2 | 2N3568 |
| Q9 | 2N3569 |
| Q10 | 2N3569 |
| Integrated Circuits | |
| U1A | Amelco 810CJ |
| U1B | Amelco 810CJ |

Although the invention has been shown in connection with the preferred embodiment, it will be readily apparent to those skilled in the art that various changes in form and arrangement of parts may be made to suit requirements without departing from the spirit and scope of the invention as defined by the appended claims.

In the claims:

1. A timer comprising in combination first and second direct-current supply terminals, a resistor and a capacitor in series having a junction terminal, the resistor being connected to the first supply terminal for charging the capacitor through the resistor, a field effect transistor having a drain connected to said junction terminal, a source connected to the second supply terminal and a gate, means for supplying a reference potential, a voltage comparator coupled between said junction terminal and said reference potential source, and timing-period initiating means for turning off the field effect transistor at the beginning of a timing period and means responsive to the comparator for turning the field effect transistor on at the end of a period to discharge the capacitor fully.

2. A timer as described in claim 1 in which the comparator is a differential amplifier with an input coupled to the said junction terminal and a second input coupled to the said reference voltage source, and the differential amplifier has an output responsive to the condition of substantial equality between the potential at said junction terminal and said reference potential.

3. A timer as described in claim 2 wherein the differential amplifier is an operational amplifier having a non-inverting input coupled to said junction terminal and an inverting input coupled to said reference potential source and a feedback coupling from the output to the inverting input.

4. A timer as described in claim 1 having a pilot lamp with an energizing circuit having means for simultaneously energizing the pilot lamp and depressing the potential of the gate of said field-effect transistor to initiate a timing period and for de-energizing the pilot lamp upon charge of the capacitor to reference potential so as to maintain the pilot lamp illuminated during the timing period during which the capacitor is being charged.

5. A timer as described in claim 3 in which a pilot lamp is provided with an energizing circuit and means are provided responsive to the output of the operational amplifier for simultaneously de-energizing the pilot lamp energizing circuit and raising the potential of the gate of the field-effect transistor to discharge said capacitor fully.

6. A timer as described in claim 5 in which an output circuit is provided including an electronic control device and a resistor in series, the control device having a control electrode coupled to the output of the operational amplifier, said discharge device and said resistor having a junction terminal and means coupled to said junction terminal for extinguishing the pilot lamp energizing circuit when current is passing through said resistor and actuating said energizing circuit when no current is flowing through said resistor.

7. A timer as described in claim 6 in which a second operational amplifier is provided which is connected as a differential amplifier having non-inverting input coupled to the capacitor and an inverting input with a feedback connection and an output coupled to the input of the comparator operational amplifier.

8. A timer as described in claim 7 wherein the output circuit includes a second discharge device in series with the first discharge device interposed between said first discharge device and said discharge circuit resistor and having a control electrode connected to said first direct-current input terminal, whereby energization of the control electrode of the first output circuit discharge device provides anode current for the second discharge device.

9. A timer as described in claim 8 wherein a failsafe discharge device is providing having an anode and a cathode connected to the control electrodes of the first and second output circuit discharge devices, respectively, and having a control electrode coupled to the gate of the field-effect transistor for short-circuiting the control electrodes of the first and second input circuit discharge devices and biasing said discharge devices to off condition whenever the potential of the gate of the field-effect transistor is raised to turn on said field-effect transistor and discharge the capacitor.

10. A timer as described in claim 9 wherein an initiating terminal is provided which is coupled to the gate of the field-effect transistor and to the control electrode of the failsafe discharge device and is normally biased to the second direct-current supply terminal, and an initiating circuit is provided which comprises means for depressing the potential of said initiating terminal to turn off said field-effect transistor and said failsafe discharge device.

11. A timer as described in claim 10 in which the pilot lamp is provided with an extinguishing device coupled to said initiating terminal.

12. A timer as described in claim 11 wherein the pilot lamp extinguishing device comprises a discharge device having a control electrode coupled to said initiating terminal and to the junction of said second output circuit discharge device and said resistor.

13. A timer as described in claim 11 wherein pilot lamp extinguishing device comprises a discharge device connected in parallel with the extinguishing device and the pilot lamp is connected to its energizing source in series with a resistor.

14. A timer as described in claim 10 wherein the initiating circuit comprises a switch connected between said initiating terminal and a point at lower potential than the first direct-current supply terminal.

15. A timer as described in claim 14 wherein the initiator switch comprises a discharge device having a control electrode adapted to be connected to a point at higher potential than said second direct-current supply terminal.

16. A timer described in claim 6 wherein the pilot lamp is an incandescent lamp and a discharge device is connected in series with said lamp and the energizing circuit therefore, having a control electrode and the lamp extinguisher means is connected to said control electrode.

17. A timer as described in claim 2, in which the comparator is so connected as to produce a relatively low output prior to the attainment of substantial equality between the potential at said junction terminal and said reference potential.

18. A timer as described in claim 2, in which the comparator is so connected as to have a relatively high output until the potential at said junction terminal attains substantial equality with the potential at the reference potential and to fall to a relatively low value after the potential at said junction terminal exceeds said reference potential.

19. A timer as described in claim 17, in which relay means is provided having a control electrode coupled to the output of the comparator and switch means connected to said control is provided for inactivating said relay means until the beginning of the timing period.

20. A timer as described in claim 18, in which relay means are provided having a control electrode coupled to the output of said comparator with means for normally forward biasing said control electrode which is insufficient to overcome the effect of occurrence of relatively low output of said comparator.

* * * * *